3,254,138
GRAFT COPOLYMERS OF ACRYLONITRILE ONTO A HOMOPOLYMERIC POLYAMIDE HAVING N-ALKYL SUBSTITUTION
Hugh J. Hagemeyer, Jr., Alden E. Blood, and James D. Heller, Longview, Tex., assignors to Eastman Kodak Company, Rochester, N.Y., a corporation of New Jersey
No Drawing. Filed Sept. 12, 1963, Ser. No. 308,339
9 Claims. (Cl. 260—883)

This invention relates to resinous graft copolymers of acrylonitrile monomer and certain polymeric amides containing N-2,2-dimethylalkyl groups, and to a process for preparing these copolymers.

Polyacrylonitrile is known to have properties which make it especially suitable for the preparation of fibers and films such as good strength and high softening point, low shrinkage at elevated temperatures, high alkali resistance, etc. However, its commercial applications have been somewhat limited because of certain other less desirable properties such as tendency toward brittleness and poor affinity for commercially available dyes. Accordingly, various modified acrylonitrile polymers have been proposed to overcome these defects, for example, by introducing modifying groups into the polymeric chain as by copolymerizing acrylonitrile with other monomers or with preformed polymers. While improved flexibility and affinity for dyes have been observed with many of such proposed modified acrylonitrile polymers, the thermal and hydrolytic stabilities thereof have not proven satisfactory, for example, for fibers and textiles where high stability is an especially important requirement.

We have now discovered that when acrylonitrile is copolymerized with minor proportions of certain preformed polymeric amides containing a N-2,2-dimethylalkyl group substituent, the resulting graft copolymers show not only good dyeability, but in addition are outstanding in their resistance to thermal, oxidative and hydrolytic degradation. Fibers, films and molded articles prepared therefrom, we have found, exhibit excellent physical properties and especially good stability. For example, the fibers, when drafted, are free from any segmentation defects, and are strong and elastic, high melting, low shrinking, readily dyeable to fast deep colors by acetate and basic type dyes, and furthermore, are very resistant to weathering, alkaline solutions, soaps and scours, as well as to attack by the common organic and dry cleaning solvents.

It is, accordingly, an object of the invention to provide a new class of modified polyacrylonitriles, i.e. graft copolymers of acrylonitrile monomer with minor proportions of preformed polymeric amides containing N-2,2-dimethylalkyl group substituents, that are ideally suited for the manufacture of fibers, films, and molded articles of outstanding physical properties and greatly improved stability to heat and oxidation, and to hydrolysis. Another object is to provide stable, homogeneous solutions of the new class of polymers in volatile organic solvents. Still another object is to provide fibers having the aforementioned advantageous physical and chemical characteristics. A further object is to provide processes for preparing these new graft copolymers and shaped articles therefrom. Other objects will become apparent from the description and examples hereinafter.

In accordance with the invention, the new class of modified polyacrylonitriles are prepared by copolymerizing acrylonitrile monomer and a preformed homopolymeric amide containing N-2,2-dimethylalkyl group substituent, in dispersion form, in the proportions of from 60–90% by weight of the monomer and from 40–10% by weight of the polymer to make a total of 100% by weight of polymerizable components, until the acrylonitrile monomer has combined with the polymeric amide to form the graft copolymers of the invention. The amides whose homopolymers can be employed in practicing the invention include N-2,2-dimethylalkyl substituted acrylamides, methacrylamides, citraconamides, itaconamides, maleamides, fumaramides, etc., which are represented by the following general structures:

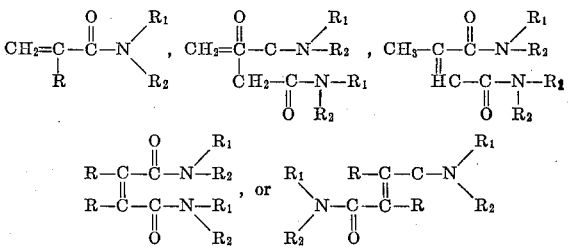

wherein each R represents hydrogen or an alkyl group of from 1–4 carbon atoms, e.g. methyl, ethyl, propyl, isopropyl, n-butyl, etc. groups, each $R_1$ represents hydrogen, an alkyl group of from 1–4 carbon atoms or a 2,2-dimethylalkyl group, and each $R_2$ represents a 2,2-dimethylalkyl group, and wherein in each instance the said 2,2-dimethylalkyl group is represented by the general structure:

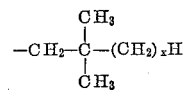

wherein $x$ is an integer of from 1–12, e.g. 2,2-dimethylpropyl, 2,2 - dimethylpentyl, 2,2 - dimethylhexyl, 2,2-dimethyldodecyl, etc. groups. Typical compounds coming within the above structures include N-2,2-dimethylpropyl acrylamide, N-2,2-dimethylbutyl acrylamide, N-2,2-dimethylhexyl acrylamide, N-2,2-dimethyldodecyl acrylamide, N-2,2-dimethyltetradecyl acrylamide, N-methyl-N-2,2-dimethylpropyl acrylamide, N-butyl-N-2,2-dimethylbutyl acrylamide, N-di-2,2-dimethylpropyl acrylamide, N-di-2,2-dimethbutyl acrylamide, etc., and corresponding methacrylamides; N,N' - di - 2,2 - dimethylpropyl itaconamide, N,N'-di-2,2-dimethylbutyl itaconamide, N,N'-tetra-2,2-dimethylbutyl itaconamide, etc., and correspondingly substituted citraconamides; and N,N'-di-2,2-dimethylpropyl maleamide, N,N' - di - 2,2 - dimethylbutyl maleamide, N,N'-tetra-2,2-dimethylbutyl maleamide, etc., and correponding fumaramides.

The above N-2,2-dimethylalkyl acrylamides and methacrylamides of the invention can be prepared by the reaction of methyl acrylate and the desired 2,2-dimethylalkylamine or methyl methacrylate and the desired amine, by the general process described in Erickson, United States Patent No. 2,451,436, dated October 12, 1948. Suitable intermediate amines for the above reaction include the following:

| | Boiling point |
|---|---|
| 2,2-dimethylbutyl amine | 113–114° C. |
| 2,2-dimethylhexyl amine | 162–163° C. |
| 2,2-dimethyloctyl amine | 203–205° C. |
| 2,2-dimethyldecyl amine | 137–140° C./20 mm. |
| Bis(2,2-dimethylbutyl) amine | 106–110° C./28 mm. |
| Bis(2,2-dimethylhexyl) amine | 140–146° C./30 mm. |

Boiling points or melting points of the resulting acrylamides and methacrylamides are as follows:

| | |
|---|---|
| N-2,2-dimethylbutyl acrylamide | M.P. 99° C. |
| N-2,2-dimethylhexyl acrylamide | B.P. 118–123° C./1 mm. |
| N-2,2-dimethyloctyl acrylamide | B.P. 130–135° C./2 mm. |
| N-2,2-dimethyldecyl acrylamide | B.P. 140–150° C./1 mm. |
| N-N-bis(2,2-dimethylbutyl) acrylamide | B.P. 102–105° C./1 mm. |
| N-N-bis(2,2-dimethylhexyl) acrylamide | B.P. 138–141° C./1 mm. |
| N-2,2-dimethylbutyl methacrylamide | B.P. 90–94° C./42 mm. |
| N-2,2-dimethylhexyl methacrylamide | B.P. 117–125° C./40 mm. |

The maleamides and fumaramides are prepared from fumaronitrile or maleonitrile and the desired alcohol. [Benson and Ritter, J. Amer. Chem. Soc., 71, 4129 (1949)] or by treatment of diethyl maleate or diethyl fumarate with the desired amine [West, J. Chem. Soc., 127, 750 (1925)]. Melting points of the subject maleamide and fumaramides are as follows:

| | M.P. ° C. (dec.) |
|---|---|
| N,N'-di-2,2-dimethylbutyl maleamide | 214–220 |
| N,N'-di-2,2-dimethylbutyl fumaramide | 310–320 |

The citraconamides and itaconamides may be prepared from the desired amine and diethyl citroconate or diethyl itaconate, both of which are known.

Advantageously, the polymerizations are carried out under nitrogen and other inert gas, in aqeous medium, although other reaction media such as organic solvents can also be used. The term "dispersion" herein is intended to include both true solutions and emulsions in aqueous or non-aqueous media. For example, organic solvents can be used such as acetonitrile, N,N-dimethylformamide, gamma-butylrolactone, etc., aromatic hydrocarbons such as n-heptane, aliphatic ethers, acetone, and the like. Mixtures of water-soluble solvents with water can also be used. The polymerizations are accelerated by heat, by actinic light such as ultraviolet light and by the use of the known polymerization catalysts such as the peroxides, e.g. benzoyl peroxide, acetyl peroxide, acetyl benzoyl peroxide, lauryl peroxide, triacetone peroxide, urea peroxide, t-butyl hydroperoxide, alkyl percarbonates, etc., hydrogen peroxide, alkali metal persulfates, e.g., sodium or potassium persulfates, ammonium persulfate, alkali metal perborates, and the like. Other useful polymerization catalysts are boron trifluoride and azo-bisnitriles. Mixtures of catalysts can be employed. The quantity of catalyst used can be varied, depending on the diluent, reaction conditions, etc. but ordinarily from about 0.01 to 2%, based on the weight of the materials to be polymerized, is efficacious.

The temperature can be varied from about room temperature to reflux temperature of the reaction mixture, e.g. from 20 to 100° C. or more. However, a temperature of from 25 to 75° C. is preferred. While normal atmospheric pressures are preferred, the reactions can also be carried out effectively at pressures substantially above or below normal atmospheric pressures. Advantageously, an activating agent such as an alkali metal bisulfite or metabisulfite, e.g. sodium or potassium bisulfite, is used in conjunction with the polymerization catalyst in approximately the same amount. Where one or other of the polymerizable components are insoluble, an emulsion technique in water can be used with advantage employing emulsifying agents such as salts of higher fatty acids, e.g. sodium or potassium stearate, palmitate, etc., ordinary soaps, salts of higher fatty alcohol sulfates, e.g. sodium or potassium lauryl sulfate, sodium or potassium stearyl sulfate, etc., salts of aromatic sulfonic acids such as alkylnaphthalene sulfonic acid, and the like. For bead or granular polymerizations relatively poor dispersing agent such as starch, methylated starch, gum arabic, polyvinyl alcohol, partially hydrolyzed polyvinyl acetate, etc. can be employed. Chain regulators such as hexyl, octyl, dodecyl, myristyl mercaptans, etc., which impart improved solubility to the resulting graft copolymers can be used in the above processes. Stirring, shaking or tumbling of the reaction mixtures facilitates the polymerizations and produce more uniform products. Separation of the products can be accomplished by conventional methods of polymer separation from reaction mixtures, for example, by filtration, by precipitation followed by filtration, etc. The resulting graft copolymers have been found to contain approximately the same proportion of constituents as were present in the starting polymerization mixtures. The processes as described above can also be carried out in continuous fashion wherein the reactants and other ingredients are added continuously to the system and the polymer is withdrawn therefrom also in continuous fashion.

The following examples will serve to illustrate further the manner in which we practice our invention.

*Example 1*

4.0 g. of poly(N-2,2-dimethylbutyl acrylamide) were added to 200 ml. of water containing 0.2 g. of potassium persulfate, 0.2 g. of potassium bisulfite, and 16.0 g. of acrylonitrile. The resulting mixture was allowed to polymerize for 16 hours at 30° C., and the resulting graft copolymer was filtered off. The polymer contained 18 percent of the acrylamide, the remainder being acrylonitrile. Fibers obtained from the polymer had a tenacity of 4 g. per denier, and extensibility of 20 percent, a sticking temperature of 200° C., and shrank 8 percent without any noticeable degradation in boiling water. The fibers readily accepted acetate and basic dyes to give fast colors.

In the place of the poly(N-2,2-dimethylbutyl acrylamide), there may be substituted in the above example an equivalent amount of any other of the homopolymers of the mentioned N-2,2-dimethylalkyl acrylamides to obtain corresponding graft copolymers and fibers having generally similar properties, for example, poly(N-2,2-dimethylpropyl acrylamide), poly(N-2,2-dimethylhexyl acrylamide), poly(N,N-di-2,2-dimethylbutyl acrylamide), etc.

*Example 2*

6.0 g. of poly(N-2,2-dimethylbutyl methacrylamide) were added to 200 ml. of water containing 0.2 g. of potassium persulfate, 0.2 g. of potassium bisulfite, and 14.0 g. of acrylonitrile. The mixture was heated for 20 hours at 35° C. After working up as in Example 1 a graft copolymer containing 30 percent by weight of the methacrylamide, 70 percent of acrylonitrile, was obtained. Fibers prepared from the polymer had a tenacity of 3.5 g. per denier, an elongation at break of 18 percent, and a softening temperature of 200° C.

In place of the poly(N-2,2-dimethylbutyl methacrylamide), there may be substituted in the above example an equivalent amount of any other of the homopolymers of the mentioned N-2,2-dimethylalkyl methacrylamides, for example, poly(N-2,2-dimethylpropyl methacrylamide), poly(N-2,2-dimethylhexyl methacrylamide), etc. to give corresponding graft copolymers and fibers having generally similar excellent properties.

*Example 3*

The experiment in Example 2 was repeated except that poly(N,N'-di-2,2-dimethylbutyl maleamide) was used instead of poly(N-2,2-dimethylbutyl methacrylamide). The tenacity of fiber prepared from the polymer was 4.2 g. per denier, the elongation at break was 15 percent, and the softening temperature was 210° C.

Any other of the homopolymers of the mentioned N-2,2-dimethylalkyl maleamides and fumaramides can be substituted for the poly(di-N-2,2-dimethylbutyl maleamide) in the above example in equivalent amount to give graft copolymers and fibers of generally similar properties.

All of the graft copolymers, i.e. modified polyacrylonitriles, described in the preceding examples can be made up into solutions or dopes with one or more polyacrylonitrile solvents such as N,N-dimethylformamide, N,N-dimethylacetamide, ethylene carbonate, gamma-butyrolactone, etc., which or without added fillers, pigments, dyes plasticizers, etc., as desired, and the dopes thus obtained can be spun to fibers by conventional wet or dry spinning processes, or the dopes can be coated or extruded to sheet materials that are flexible and tough and useful as high-stability wrapping materials, photographic film supports, and the like. The polymers can also be used to prepare molding compositions for compression, extrusion or injection molding of shaped articles. Further, they are compatible with various other synthetic polymers forming intimate blends therewith, for example, polyacrylonitrile, various copolymers of acrylonitrile and alkyl acrylates and methacrylate, copolymers of acrylonitrile and acrylic amides such as acrylamide, methacrylamides, copolymers of acrylonitrile and styrene, polybutadiene, acrylic amide homopolymers, etc.

While the above examples are concerned just with graft copolymers of the invention prepared from acrylonitrile monomer and homopolymers of acrylamides, methacrylamides, maleamides and fumaramides containing N-2,2-dimethylalkyl group substituents, it will be apparent that those species of graft copolymers prepared from acrylonitrile monomer and homopolymers of the defined itaconamides and citraconamides containing N-2,2-dimethylalkyl group substituents also come within the invention and likewise give high stability shaped articles.

The invention has been described in detail with particular reference to preferred embodiments thereof, but it will be understood that variations and modifications can be effected within the spirit and scope of the invention as described hereinabove and as defined in the appended claims.

What we claim is:

1. A resinous graft copolymer of (1) from 60–90% by weight of acrylonitrile monomer and (2) from 40–10% by weight of the homopolymer of a compound selected from those represented by the following general formulas:

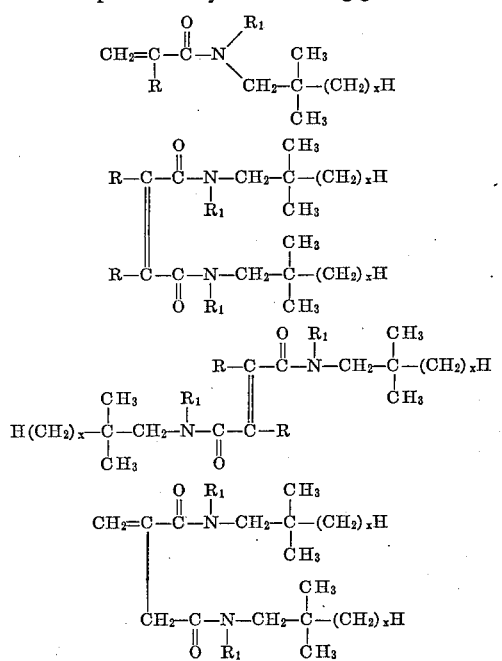

and

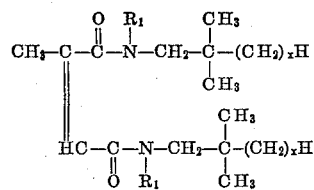

wherein $x$ represents an integer of from 1–12, R represents a member selected from the group consisting of a hydrogen atom and an alkyl group of from 1–4 carbon atoms and each $R_1$ represents a member selected from the group consisting of a hydrogen atom, an alkyl group of from 1–4 carbon atoms and the group

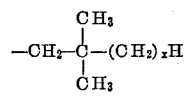

wherein $x$ is as above defined.

2. A resinous graft copolymer of (1) from 60–90% by weight of acrylonitrile monomer and (2) from 40–10% by weight of the homopolymer of a compound represented by the following general formula:

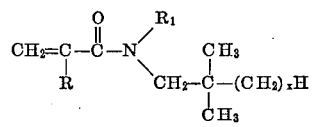

wherein $x$ represents an integer of from 1–12, R represents a member selected from the group consisting of a hydrogen atom and an alkyl group of from 1–4 carbon atoms and each $R_1$ represents a member selected from the group consisting of a hydrogen atom, an alkyl group of from 1–4 carbon atoms and the group

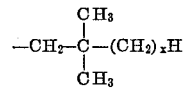

wherein $x$ is as above defined.

3. A resinous graft copolymer of (1) from 60–90% by weight of acrylonitrile monomer and (2) from 40–10% by weight of the homopolymer of a compound represented by the following general formula:

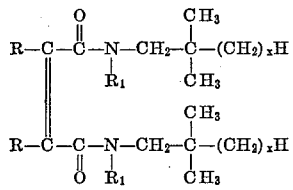

wherein $x$ represents an integer of from 1–12, R represents a member selected from the group consisting of a hydrogen atom and an alkyl group of from 1–4 carbon atoms and each $R_1$ represents a member selected from the group consisting of a hydrogen atom, an alkyl group of from 1–4 carbon atoms and the group

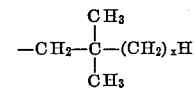

wherein $x$ is as above defined.

4. A resinous graft copolymer of (1) from 60–90% by weight of acrylonitrile monomer and (2) from 40–10% by weight of poly(N-2,2-dimethylbutyl acrylamide).

5. A resinous graft copolymer of (1) from 60-90% by weight of acrylonitrile monomer and (2) from 40-10% by weight of poly(N-2,2-dimethylbutyl methacrylamide).

6. A resinous graft copolymer of (1) from 60-90% by weight of acrylonitrile monomer and (2) from 40-10% by weight of poly(N,N'-di-2,2-dimethylbutyl maleamide).

7. A resinous graft copolymer of (1) from 60-90% by weight of acrylonitrile monomer and (2) from 40-10% by weight of poly(N,N' - di - 2,2 - dimethylbutyl fumaramide).

8. A resinous graft copolymer of (1) from 60-90% by weight of acrylonitrile monomer and (2) from 40-10% by weight of poly(N-2,2-dimethylpropyl acrylamide).

9. A process for preparing a resinous graft copolymer which comprises heating in the presence of a polymerization catalyst an aqueous mixture comprising (1) from 60-90% by weight of acrylonitrile monomer and (2) from 40-10% by weight of the homopolymer of a compound selected from those represented by the following general formulas:

$$CH_2=C-\underset{R}{\overset{\underset{\displaystyle O}{\|}}{C}}-\underset{CH_2-\underset{\underset{\displaystyle CH_3}{|}}{\overset{\underset{\displaystyle CH_3}{|}}{C}}-(CH_2)_xH}{\overset{R_1}{N}}$$

$$R-\overset{\underset{\displaystyle O}{\|}}{C}-\underset{R_1}{\overset{\underset{\displaystyle |}{}}{N}}-CH_2-\underset{\underset{\displaystyle CH_3}{|}}{\overset{\underset{\displaystyle CH_3}{|}}{C}}-(CH_2)_xH$$

$$R-\overset{\|}{\underset{\overset{\displaystyle \|}{O}}{C}}-\underset{R_1}{\overset{|}{N}}-CH_2-\underset{\underset{\displaystyle CH_3}{|}}{\overset{\underset{\displaystyle CH_3}{|}}{C}}-(CH_2)_xH$$

$$H(CH_2)_x-\underset{\underset{\displaystyle CH_3}{|}}{\overset{\underset{\displaystyle CH_3}{|}}{C}}-CH_2-\underset{R_1}{\overset{|}{N}}-\underset{\overset{\displaystyle \|}{O}}{C}-\overset{\|}{C}-R \quad R-\overset{\underset{\displaystyle O}{\|}}{C}-\underset{R_1}{\overset{|}{N}}-CH_2-\underset{\underset{\displaystyle CH_3}{|}}{\overset{\underset{\displaystyle CH_3}{|}}{C}}-(CH_2)_xH$$

and $$CH_2=C-\underset{\overset{\displaystyle |}{}}{\overset{\underset{\displaystyle O}{\|}}{C}}-\underset{R_1}{\overset{|}{N}}-CH_2-\underset{\underset{\displaystyle CH_3}{|}}{\overset{\underset{\displaystyle CH_3}{|}}{C}}-(CH_2)_xH$$

$$CH_2-\underset{\overset{\displaystyle \|}{O}}{C}-\underset{R_1}{\overset{|}{N}}-CH_2-\underset{\underset{\displaystyle CH_3}{|}}{\overset{\underset{\displaystyle CH_3}{|}}{C}}-(CH_2)_xH$$

$$CH_3=C-\underset{\overset{\displaystyle |}{}}{\overset{\underset{\displaystyle O}{\|}}{C}}-\underset{R_1}{\overset{|}{N}}-CH_2-\underset{\underset{\displaystyle CH_3}{|}}{\overset{\underset{\displaystyle CH_3}{|}}{C}}-(CH_2)_xH$$

$$HC-\underset{\overset{\displaystyle \|}{O}}{C}-\underset{R_1}{\overset{|}{N}}-CH_2-\underset{\underset{\displaystyle CH_3}{|}}{\overset{\underset{\displaystyle CH_3}{|}}{C}}-(CH_2)_xH$$

wherein $x$ represents an integer of from 1–12, R represents a member selected from the group consisting of a hydrogen atom and an alkyl group of from 1–4 carbon atoms and each $R_1$ represents a member selected from the group consisting of a hydrogen atom, an alkyl group of from 1–4 carbon atoms and the group $$-CH_2-\underset{\underset{\displaystyle CH_3}{|}}{\overset{\underset{\displaystyle CH_3}{|}}{C}}-(CH_2)_xH$$

wherein $x$ is as above defined, unless the said acrylonitrile monomer has polymerized to form the said graft copolymer.

References Cited by the Examiner

UNITED STATES PATENTS

| | | | |
|---|---|---|---|
| 2,719,144 | 9/1955 | Shearer et al. | 260—85.5 |
| 2,883,360 | 4/1959 | Coover et al. | 260—883 |
| 3,070,558 | 12/1962 | Coover | 260—85.5 |
| 3,151,089 | 9/1964 | Miller | 260—85.5 |

MURRAY TILLMAN, *Primary Examiner.*

J. T. GOOLKASIAN, *Assistant Examiner.*